US009097241B1

(12) United States Patent  
Hollick et al.

(10) Patent No.: US 9,097,241 B1
(45) Date of Patent: Aug. 4, 2015

(54) TRANSPIRED SOLAR COLLECTOR CHIMNEY TOWER

(71) Applicant: HOLLICK SOLAR SYSTEMS LIMITED, King City (CA)

(72) Inventors: John C. Hollick, King City (CA); Dogan Eryener, Yaylaevler A/4 (TR)

(73) Assignee: Hollick Solar Systems Limited, King City (CA)

( * ) Notice: Subject to any disclaimer, the term of this patent is extended or adjusted under 35 U.S.C. 154(b) by 0 days.

(21) Appl. No.: 14/504,740

(22) Filed: Oct. 2, 2014

(51) Int. Cl.
F03D 9/00 (2006.01)
H02P 9/04 (2006.01)
F03G 6/04 (2006.01)
H02K 7/18 (2006.01)

(52) U.S. Cl.
CPC .............. *F03G 6/045* (2013.01); *H02K 7/1823* (2013.01)

(58) Field of Classification Search
CPC ........... F03D 1/04; F03D 9/002; F03D 9/007; Y02E 10/465; Y02E 10/72; Y02E 10/725; Y02E 10/74; Y02E 10/44
USPC ............ 290/54, 55, 44, 1 R, 52; 415/4.2, 4.4, 415/909
See application file for complete search history.

(56) References Cited

U.S. PATENT DOCUMENTS

| 5,381,048 A | 1/1995 | Baird |
| 5,608,268 A | 3/1997 | Senanayake |
| 6,089,021 A | 7/2000 | Senanayake |
| 6,772,593 B2 * | 8/2004 | Dunn .......................... 60/641.11 |
| 7,086,823 B2 | 8/2006 | Michaud |
| 7,938,615 B2 | 5/2011 | Michaud |
| 7,956,487 B2 | 6/2011 | Hovakimian |
| 2003/0217551 A1 | 11/2003 | Drucker |
| 2004/0183309 A1 | 9/2004 | Moreno |
| 2005/0150225 A1 | 7/2005 | Gwiazda et al. |

(Continued)

FOREIGN PATENT DOCUMENTS

| CN | 1766309 A | 5/2006 |
| CN | 101016878 A | 8/2007 |

(Continued)

OTHER PUBLICATIONS

Bergerman, R., et al., Slide Presentation: "Realization and Costs of Solar Updraft Towers" Schlaich Bergermann Solar GmbH. 2011.

(Continued)

*Primary Examiner* — Tulsidas C Patel
*Assistant Examiner* — Thomas Quigley
(74) *Attorney, Agent, or Firm* — Perry + Currier Inc.

(57) ABSTRACT

A transpired solar collector chimney tower is provided. Specifically, disclosed herein is a system that uses solar radiation for generating electricity comprising: a transpired solar air heating collector device comprising: a heat absorbing roof; an interior space adjacent the heat absorbing roof; and, a plurality of air inlet openings distributed over the heat absorbing roof and configured to allow ambient air to flow from outside the heat absorbing roof into the interior space; a chimney tower extending from the transpired solar air heating collector device and connected to the interior space such that heated air in the interior space flows from the interior space through the chimney tower; and, one or more turbines positioned within one or more of the interior space and the chimney tower and on a path of airflow from the interior space through the chimney tower.

12 Claims, 7 Drawing Sheets

(56) References Cited

U.S. PATENT DOCUMENTS

| | | |
|---|---|---|
| 2006/0016182 A1 | 1/2006 | Comandu et al. |
| 2006/0156725 A1 | 7/2006 | Kenessey |
| 2008/0314058 A1 | 12/2008 | Jones et al. |
| 2009/0152370 A1 | 6/2009 | Pesochinsky |
| 2009/0212570 A1 | 8/2009 | Le et al. |
| 2009/0302614 A1 | 12/2009 | Ireland |
| 2010/0219637 A1 | 9/2010 | Hovakimian |
| 2010/0275598 A1 | 11/2010 | Raffaele et al. |
| 2010/0278629 A1 | 11/2010 | Krippene |
| 2012/0153628 A1 | 6/2012 | Klinkman |
| 2012/0240551 A1 | 9/2012 | Johnson |
| 2013/0229015 A1 | 9/2013 | Tepic |
| 2014/0084591 A1 | 3/2014 | Baker |

FOREIGN PATENT DOCUMENTS

| | | |
|---|---|---|
| CN | 101178054 A | 5/2008 |
| CN | 101220800 A | 7/2008 |
| CN | 101303000 A | 11/2008 |
| CN | 101315065 A | 12/2008 |
| CN | 201340104 Y | 11/2009 |
| CN | 201671772 U | 12/2010 |
| CN | 102128150 A | 7/2011 |
| CN | 202176465 U | 3/2012 |
| CN | 202281226 U | 6/2012 |
| CN | 202348591 U | 7/2012 |
| CN | 102691626 A | 9/2012 |
| CN | 202510285 U | 10/2012 |
| CN | 202990534 U | 6/2013 |
| CN | 102410156 B | 7/2013 |
| CN | 203298416 U | 11/2013 |
| CN | 102536693 B | 12/2013 |
| DE | 19821659 A1 | 11/1999 |
| DE | 10023424 A1 | 11/2001 |
| DE | 102008018433 A1 | 10/2009 |
| DE | 102012017707 A1 | 3/2014 |
| DE | 102012022371 A1 | 5/2014 |
| FR | 2953881 A1 | 6/2011 |
| FR | 2957388 A1 | 9/2011 |
| FR | 2965902 A1 | 4/2012 |
| KR | 20090078030 A | 7/2009 |
| KR | 20130043303 A | 4/2013 |
| KR | 20130116449 A | 10/2013 |
| WO | WO 9516858 A1 | 6/1995 |
| WO | WO 0042320 A1 | 7/2000 |
| WO | WO 2004036039 A1 | 4/2004 |
| WO | WO 2005064101 A1 | 7/2005 |
| WO | WO 2007022556 A1 | 3/2007 |
| WO | WO 2008142459 A2 | 11/2008 |
| WO | WO 2009060245 A1 | 5/2009 |
| WO | WO 2011098642 A1 | 8/2011 |
| WO | WO 2011137735 A2 | 11/2011 |
| WO | WO 2011144779 A1 | 11/2011 |
| WO | WO 2012061859 A2 | 3/2012 |
| WO | WO 2012079555 A1 | 6/2012 |
| WO | WO 2013185982 A1 | 12/2013 |
| WO | WO 2014035453 A2 | 3/2014 |

OTHER PUBLICATIONS

Bugutekin, A., Experimental Study of Temperature Field in a Solar Chimney Plant in Adiyaman. J. of Thermal Science and Technology. 2012. vol. 32, Iss 2. pp. 73-80.

Data Sheet: Solar Chimney Manzanares. Schlaich Bergermann und Partner GmbH. 2011.

Dhahri, A., et al., A Review of Solar Chimney Power Generation Technology. International Journal of Engineering and Advanced Technology (IJEAT). Feb. 2013. vol. 2, Iss 3. pp. 1-17. ISSN: 2249-8958.

English Abstract of JO1873 (B), issued on Dec. 27, 1995 to Senanayake Daya Ranjit.

Kratzig, W.B., Physics, computer simulation and optimization of thermo-fluidmechanical processes of solar updraft power plants. Solar Energy. Dec. 2013. vol. 98, Part A. pp. 2-11.

Ming, T., et al. Fighting global warming by climate engineering: Is the Earth radiation management and the solar radiation management any option for fighting climate change? Renewable and Sustainable Energy Reviews. Mar. 2014. vol. 31. pp. 792-834.

Ming, T., et al., Numerical analysis on the solar updraft power plant system with a blockage. Solar Energy. Dec. 2013. vol. 98, Part A. pp. 58-69.

Schlaich Bergermann und Partner GmbH, Report: The Solar Chimney. Schlaich Bergermann und Partner GmbH. 2002. pp. 1-14.

Schlaich J. et al., Design of Commercial Solar Updraft Tower Systems—Utilization of Solar Induced Convective Flows for Power Generation. ASME. J. Sol. Energy Eng.. 2005;127(1):117-124. doi:10.1115/1.1823493.

Thomas, M.H., et al. The Solar Tower: Large-Scale Renewable Energy Power Station Development. 19th World Energy Congress, Sydney, Australia. Sep. 5-9, 2004. pp. 1-13.

Zhou, X., et al. Influence of atmospheric cross flow on solar updraft tower inflow. Energy. Jun. 2012. vol. 42, Iss 1, pp. 393-400.

Zhou, X., et al., Analysis of Chimney Height for Solar Chimney Power Plant. Applied Thermal Engineering. Jan. 2009. vol. 29, Iss 1. pp. 178-185.

Corresponding European Patent Application No. 14191384.8, "Search Report" dated Mar. 13, 2015.

\* cited by examiner

TRANSPIRED SOLAR COLLECTOR CHIMNEY TOWER

FIELD

The specification relates generally to solar chimney towers, and specifically to a transpired solar collector chimney tower.

BACKGROUND

Air can be made to move by solar energy and the moving air can be directed towards a wind turbine to produce electricity. In solar updraft towers or chimneys, sunshine heats the air beneath a very wide greenhouse-type roofed collector structure (i.e. with transparent and/or glazed panels) surrounding the central base of a very tall chimney tower. The heating causes convection currents which move the air towards the tower by the chimney effect. This airflow drives wind turbines placed in the chimney or around the chimney base to produce electricity. The glazing can consist of a glass or polymer membrane stretched nearly horizontally above the ground. The height of the glazing increases towards the tower base where the heated air is diverted from horizontal into vertical movement with minimum friction loss. The glazing admits the shortwave solar radiation to penetrate and retains long wave re-radiation from the heated ground. Thus the ground under the roof heats up and transfers its heat to the air which enters the circumference of the solar collector array and flows radially to the tower and then rises up the chimney.

However, such greenhouse style collectors used with solar towers have numerous problems that include high costs, very low efficiencies, low temperature rises and large land masses required to generate thermal energy to create sufficient air movement. In other words, very large areas of glazing in the roofs are used to generate the air flow.

Furthermore, the roofs can easily accumulate dust in the large areas, so solar-optical efficiency decreases over time due to dust accumulation and/or the glazing must be cleaned. Furthermore, the durability of such transparent roofs is low as transparent panels are difficult to ruggedize. Further glass panels can be broken easily; and plastic or polymer glazing used as roofs will degrade over time when exposed to UV rays and thin plastic sheets may tear apart under strong wind conditions.

Such roofs also have thermal problems which include low solar efficiencies and low temperature rise which affects the general energy conversion of solar tower or chimney. The low efficiencies require larger solar collector areas to produce more heat and air movement which require higher investment costs.

SUMMARY

The present specification is generally directed to an apparatus that includes a transpired solar collector to heat air, and which is generally configured to move the heated air to a chimney tower extending from the transpired solar collector, in order to turn a turbine. The transpired solar collector comprises a heat absorbing roof, and an interior space. For example, the heat absorbing roof can be formed from one or more perforated heat absorbing panels, and sidewalls can extend from the heat absorbing roof to at least partially define the interior space. Air inlet openings are distributed over the heat absorbing roof, which allow air to flow from an outward side of the heat absorbing roof there through and into the interior space. Solar radiation heats the heat absorbing roof which in turn heats air within the interior space; an air pressure difference is created between air in the interior space and air outside the transpired solar collector, which causes the heated air in the interior space to flow through the chimney, thereby turning a turbine, with ambient air being drawn into the interior space through the air inlet openings.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a system that uses solar radiation for generating electricity comprising: a transpired solar air heating collector device comprising: a heat absorbing roof; an interior space adjacent the heat absorbing roof; and, a plurality of air inlet openings distributed over the heat absorbing roof and configured to allow ambient air to flow from outside the heat absorbing roof into the interior space; a chimney tower extending from the transpired solar air heating collector device and connected to the interior space such that heated air in the interior space flows from the interior space through the chimney tower; and, one or more turbines positioned within one or more of the interior space and the chimney tower and on a path of airflow from the interior space through the chimney tower.

The transpired solar air heating collector device can further comprise sidewalls extending from the heat absorbing roof, the sidewalls and the heat absorbing roof at least partially defining the interior space.

A total open area of the plurality of air inlet openings about can be greater than a total cross-section of air volume exiting the chimney tower when the heated air in the interior space flows from the interior space through the chimney tower.

The transpired solar air heating collector device can be configured to absorb solar irradiation and heat air one or more of within the interior space and adjacent to the heat absorbing roof, when the interior space is one or more of closed and in an in-use position on a surface.

The transpired solar air heating collector device can be configured to form an air updraft through the chimney tower created by the heated air within the interior space.

An outward side of the heat absorbing roof can be one or more of a solar irradiation absorbing colour, and black.

The heat absorbing roof can be formed from one or more of perforated heat absorbing panels, flat perforated heat absorbing panels and corrugated perforated heat absorbing panels.

The heat absorbing roof can comprise a metal material.

The one or more turbines can comprise an arrangement of turbines that surround a base of the chimney tower.

Each of the one or more turbines can be connectable to one or more of an electricity storage device and a power grid.

The system can further comprises a support structure located within the interior space, the support structure configured to support one or more of the transpired solar air heating collector device and the chimney tower when the transpired solar air heating collector device is installed on a surface.

The transpired solar air heating collector device can be configured for installation on a surface.

The transpired solar air heating collector device can further be one or more glazed panels adjacent one or more perforated heat absorbing panels of the heat absorbing roof, the one or more glazed panels and the one or more perforated heat absorbing panels forming a roof of the transpired solar air heating collector device, and the one or more glazed panels being one or more of perforated and non-perforated.

The system can further comprise one or more glazed panels over at least a portion of the heat absorbing roof, the one or more glazed panels and the heat absorbing roof defining a second space, the heat absorbing roof separating the interior space and the second space.

The system can further comprise a second heat absorbing surface comprising a plurality of respective air inlet openings, and one or more glazed panels adjacent the heat absorbing roof and over the second heat absorbing surface, the second heat absorbing surface separating the interior space from a second interior space adjacent the chimney tower.

Another aspect of the specification provides a method for generating electricity comprising: creating an air pressure difference between an interior space of a transpired solar air heating collector device and a chimney tower connected thereto, the transpired solar air heating collector device comprising: a heat absorbing roof; an interior space adjacent the heat absorbing roof; and, a plurality of air inlet openings distributed over the heat absorbing roof and configured to allow ambient air to flow from outside the heat absorbing roof into the interior space, the air pressure difference created when sun radiation illuminates the heat absorbing roof; and, generating electricity using one or more turbines positioned on a path of airflow from the interior space through the chimney tower.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
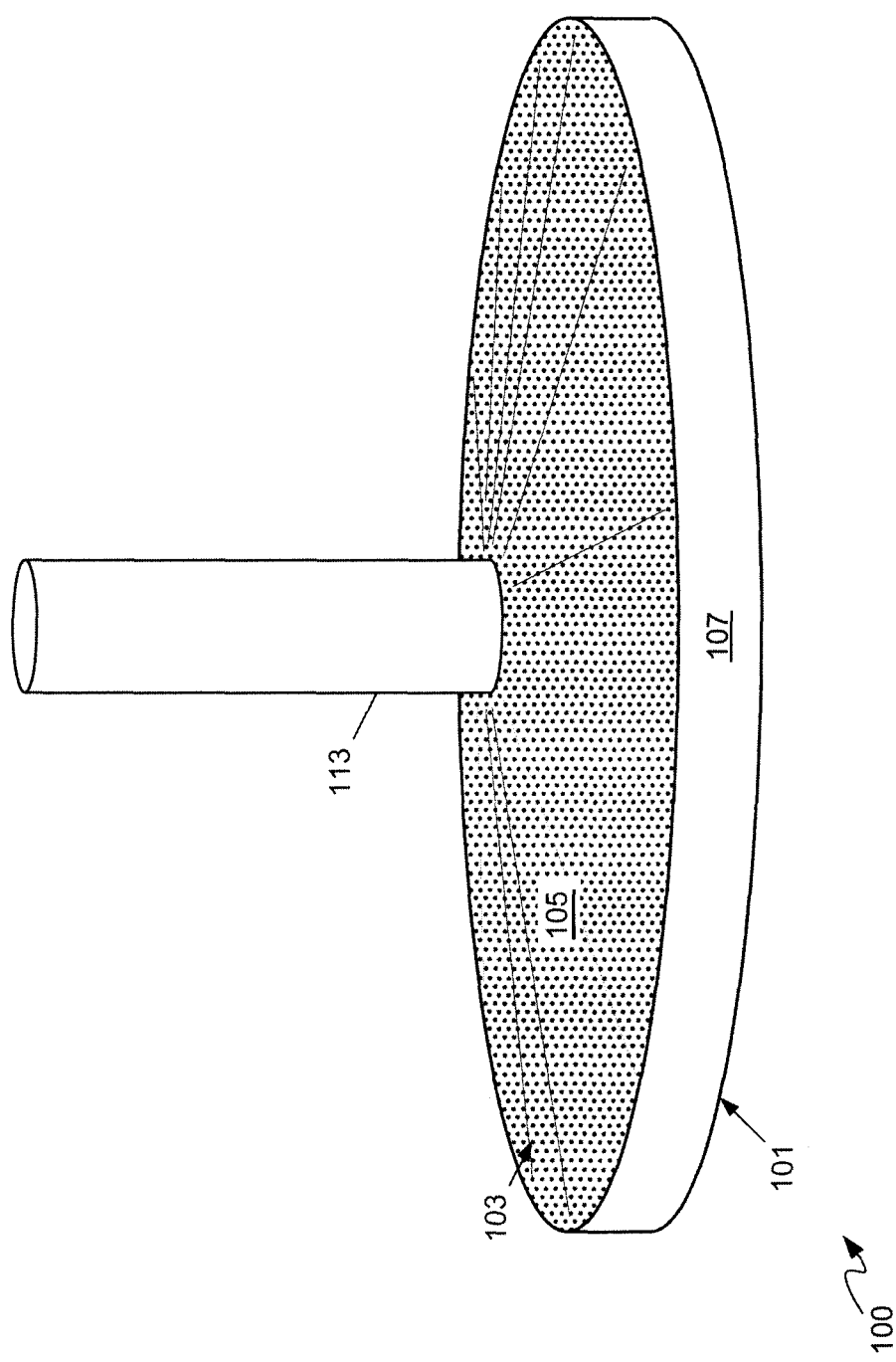
FIG. 1 depicts a perspective view of system that includes a transpired solar collector chimney tower, according to non-limiting implementations.

Implementations of transpired solar collector chimney tower, and specifically a transpired solar collector updraft chimney tower, described herein can have increased efficiency over solar chimney towers which use greenhouse-type solar collectors. In such greenhouse-type solar collectors the roof of the collector comprises glass or plastic solar collectors, which generally suffer from significant heat losses and diminished stability of the whole structure, which can decrease overall tower performance. Furthermore, turbines in such greenhouse-type solar collectors are driven by air flow produced by buoyancy resulting from greenhouse effect inside the collector. The glass or plastic roof of the greenhouse-type collector allows the transmission of solar irradiation to the ground. The ground surface absorbs the transmitted radiation and reflects it to heat the air entering the collector. As a result, the ground under the roof heats up which, in turn, heats the air flowing radially above it. In this case, the heating of the air in the collector is achieved indirectly because the temperature of the ground is higher than temperature of air entering the collectors. Because of multiple stages in air heating process between glass roof of the collector and soil surface under the collector there is poor heat transfer and significant heat losses which lead to a lower overall system efficiency.

Transpired solar collector chimney towers described herein combine three components: a transpired solar collector device, a chimney tower extending from the transpired solar collector device, and a power conversion unit comprising one or more turbines. Rather than glass or plastic, transpired solar air heating collectors are used in a roof of the transpired solar collector device which allows direct heating of the air therein without employing greenhouse technology. The transpired solar collector device comprises a heat absorbing roof (which can be metal and the like) and which allows ambient air to pass through perforations and/or micro-perforations, picking up the heat in the process. Such air flow occurs due to the pressure difference between the air at the top of the chimney tower and air at the transpired solar collector device which, when in use, is generally located next to a surface and/or the ground (i.e. of the Earth). The total open area of the perforations is generally sized to be larger than the total cross-section of air volume exiting the chimney which will allow the air speed to increase as it reaches the chimney and turbines. However, in other implementations the total open area of the perforations can be generally sized to be about matched with the total cross-section of air volume exiting the chimney The transpired solar air collector, which can have a large area as compared to a diameter of the chimney tower, comprises flat and/or corrugated heat absorbing sheets and/or panels supported above the ground by a column structure and support matrix which can be stretched out horizontally for many meters. The height of the solar collector roof can increase slightly along a radius towards one or more of a center thereof and the chimney tower to guide inward airflow.

The chimney tower comprises a hollow vertical structure, that can range in height, though the higher the better, and can be generally located in about the center of, or off centre, the solar air collector device, so that the roof of the transpired solar air collector device surrounds the tower.

The heated air generated in the transpired solar collector device, enters a bottom open end of the chimney tower, also known as a tower base. Since the heated air is lighter than the outdoor ambient air, it rises through the chimney tower, and exits the chimney tower through a second open end at the top of the chimney tower.

The difference in temperature and/or pressure between the air at the very top of the tower and the air in the solar collector device creates air updraft in the tower, which increases air speed through the system.

In some implementations, the heat absorbing roof of the transpired solar collector device can be interspersed and/or alternated with transparent glazing which will allow some of the light to pass through to heat the ground surface which will radiate heat into the collector at night, hence allow the chimney effect to continue at night.

In other implementations, perforated panels can be located under transparent glazing sections to assist with heat transfer and to heat the air adjacent the perforated panels to higher temperatures than would be possible with just the ground being heated.

An array of turbines can be located at the bottom of the tower. The turbine is arranged to be driven by flow of the moving air stream.

Figure 2:
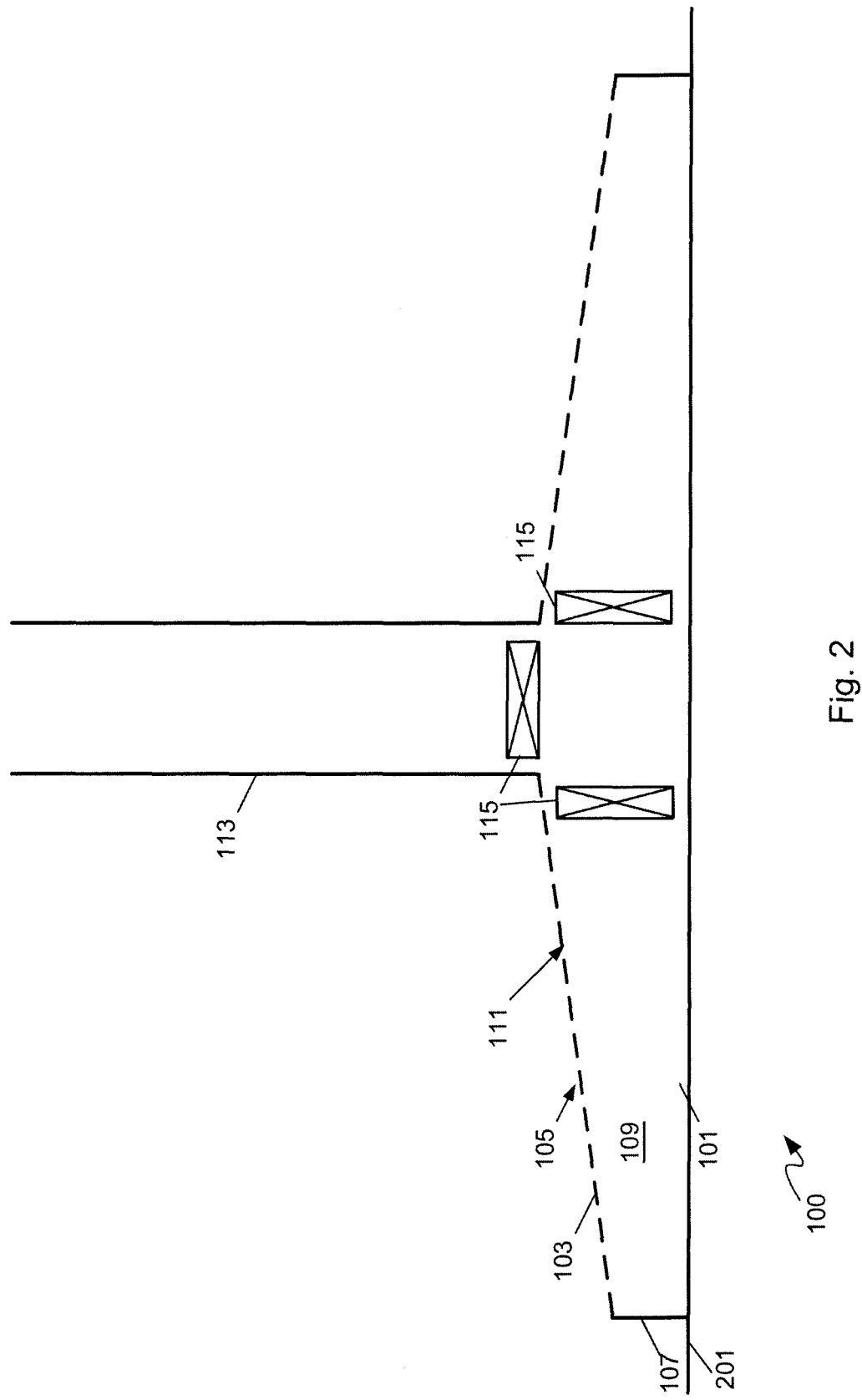
FIG. 2 depicts a schematic cross-sectional view through a diameter of the system of FIG. 1, according to non-limiting implementations.

Attention is hence directed to FIGS. 1 and 2 which respectively depict a perspective view, and a schematic cross-sectional view of a system 100 that uses solar radiation for generating electricity. Indeed, system 100 can also be referred to as a transpired solar collector chimney tower and/or a transpired solar collector updraft chimney tower. The cross-section depicted in FIG. 2 is generally through a diameter of system 100. System 100 comprises: a transpired solar air heating collector device 101 comprising: a heat absorbing roof 105; an interior space 109 adjacent the heat absorbing roof 105 (as best seen in FIG. 2); and, a plurality of air inlet openings 111 (drawn in exaggeration in FIG. 2 for clarity) distributed over heat absorbing roof 105 and configured to allow ambient air to flow from outside heat absorbing roof 105 into interior space 109. System 100 further comprises: a chimney tower 113 extending from transpired solar air heating collector device 101 and connected to interior space 109 such that heated air in interior space 109 flows from interior space 109 through chimney tower 113. System 100 further comprises one or more turbines 115 (best seen in FIG. 2) positioned within one or more of interior space 109 and chimney tower 113 and on a path of airflow from interior space 109 through chimney tower 113. As depicted, transpired solar air heating collector device 101 further comprises sidewalls 107 extending from heat absorbing roof 105, sidewalls 107 and heat absorbing roof 105 at least partially defining interior space 109.

System 100 is generally configured for installation on one or more of the ground (i.e. of a desert, earth, a field, and the like), and a surface 201 (including, but not limited to, one or more of a concrete pad, an asphalt pad, and the like), so that, in an in-use position, heat absorbing roof 105 faces the sky, one or more sidewalls 107 extend to a surface 201 upon which system 100 is resting, so that interior space 109 can be further defined by surface 201, and an open end of chimney tower 113 extends upward. In other words, transpired solar air heating collector device 101 can be open on a side opposite chimney tower 113, with surface 201 underneath transpired solar air heating collector device 101 forming a bottom of interior space 109 when system 100 is in an in-use position. However, surface 201 is not part of transpired solar air heating collector device 101 which is hence open at a bottom end (for example see FIG. 3), though, in other implementations, transpired solar air heating collector device 101 can comprise a heat storage bottom. Regardless, interior space 109 is generally closed when system 100 is in an in-use position on surface 201 so that airflow is directed from interior space 109 through chimney tower 113: in other words, interior space 109 is closed in at least an in-use position, for system 100 to function, however system 100 can be shipped with at least a portion of interior space 109 being open prior to installation.

Heat absorbing roof 105 can comprise one or more perforated heat absorbing panels 103, which can include, but is not limited to, one or more metal panels with perforations therein, each of which can have an outward side of that is one or more of a solar irradiation absorbing colour, and black. For example, each of the one or more perforated heat absorbing panels 103 can be painted black, and the like. Furthermore, each of the one or more perforated heat absorbing panels 103 can be one or more of flat and corrugated, and can comprise a metal material, though other materials which can absorb heat, and which can be formed into roof 105, are within the scope of present implementations. In particular non-limiting implementations, each of one or more perforated heat absorbing panels 103 can comprise a corrugated panel with perforations as disclosed in each of U.S. Pat. No. 4,899,728 (to Peter et al.) and U.S. Pat. No. 4,934,338 (to Hollick et al.), each of which are incorporated herein by reference; each of U.S. Pat. No. 4,899,728 and U.S. Pat. No. 4,934,338 disclose preheating ventilation air for a building with a corrugated collector panel in which air passes along channels of the corrugated collector panel and is heated by a combination of solar heat from the panel and heat loss from the interior of the building as the air passes through the panel. However, other perforated heat absorbing panels are within the scope of present implementations. For example, each of one or more perforated heat absorbing panels 103 can be flat, corrugated, textured, and the like, and/or a combination thereof.

Heat absorbing roof 105 is hence generally formed from one or more perforated heat absorbing panels 103, for example, the one or more perforated heat absorbing panels 103 interlocked and/or attached together using suitable attachment apparatus, such as screws, glues, solder, and the like. In general, when system 100 is in an in-use position, heat absorbing roof 105 will be one or more of facing upward and/or facing towards the sky. Hence, the sun heats heat absorbing roof 105, which in turn heats air adjacent thereto, including air in interior space 109, and ambient air adjacent an outward side of heat absorbing roof 105.

One or more sidewalls 107 generally extend from heat absorbing roof 105. For example, transpired solar air heating collector device 101 is generally configured for installation on a surface 201, and, in an in-use position, one or more sidewalls 107 can hence extend from heat absorbing roof 105 to surface 201. Furthermore, one or more sidewalls 107 can comprise one or more of metal, and a structural material, which can, in some implementations, at least partially support heat absorbing roof 105.

Figure 3:
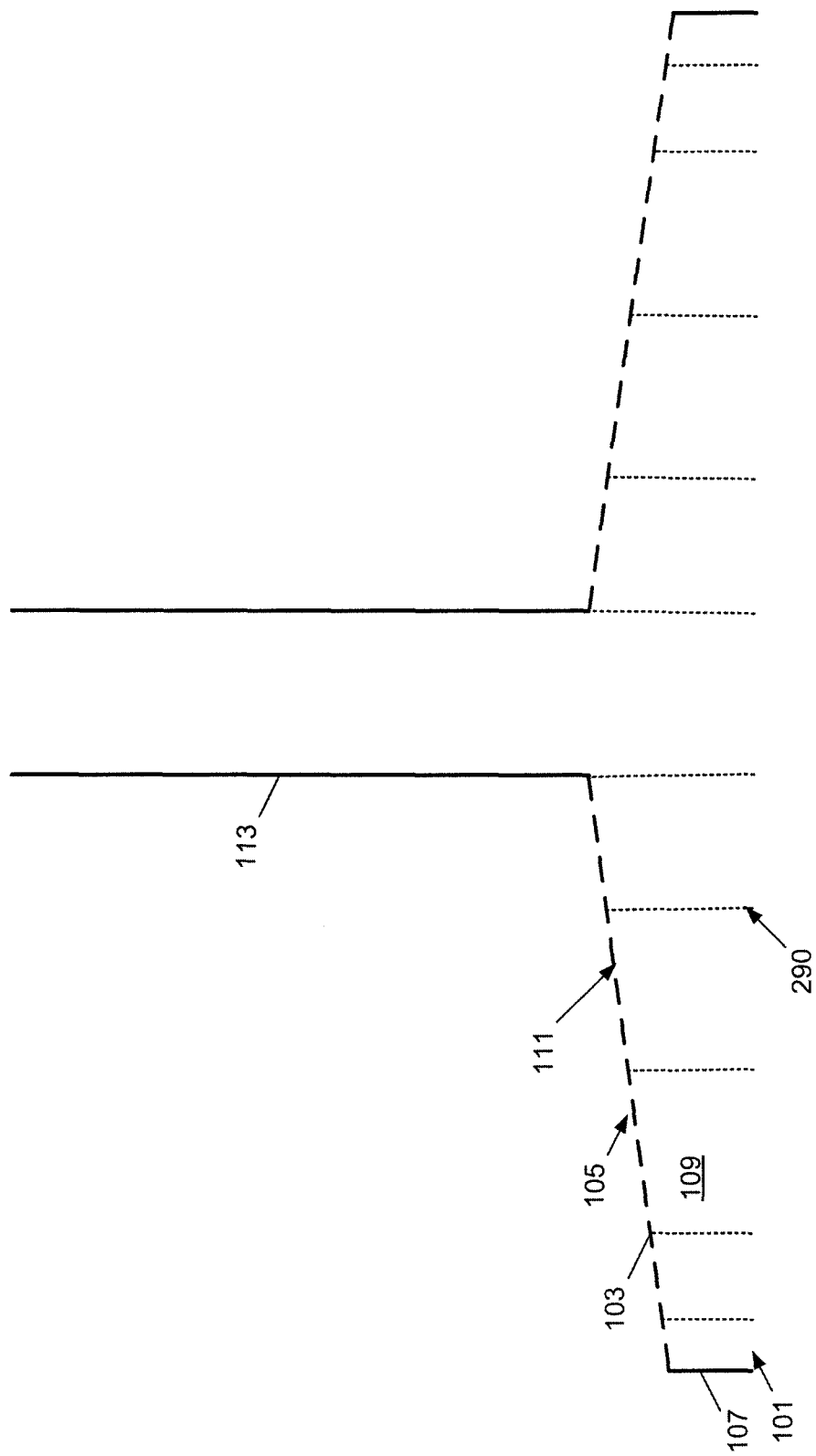
FIG. 3 depicts another schematic cross-sectional view through a diameter of the system of FIG. 1 to show a support structure, according to non-limiting implementations.

However, attention is briefly directed to FIG. 3, which depicts another view of a cross-section of system 100, similar to FIG. 2, but showing a support structure 290 located within interior space 109, support structure 290 configured to support one or more of transpired solar air heating collector device 101 and chimney tower 113 when transpired solar air heating collector device 101 is installed on surface 201. Support structure 290 is depicted schematically and in broken lines and can include, but is not limited struts, posts, guy-wires, and the like, located in interior space 109, and which can support one or more of transpired solar air heating collector device 101 and chimney tower 113 on surface 201. However, support structure 290 can further include one or more exterior support structure components; for example, system 100 can include exterior guy-wires which support chimney tower 113.

Furthermore, support structure 290 is configured to allow air flow through interior space 109 to chimney tower 113. For example, while support structure 290 can also include walls and baffles etc., such walls and baffles are positioned and/or are configured to either not interfere with air flow through interior space 109 to chimney tower 113 and/or to facilitate and/or assist and/or to direct air flow through interior space 109 to chimney tower 113. For example walls and baffles can extend along a radius and/or a diameter of interior space 109, for example extending towards sidewalls 107 and chimney tower 113. Furthermore, walls and/or baffles can include apertures for air to flow there through.

It is noted that in FIG. 3, one or more turbines 115 are not depicted for clarity, and that FIG. 3 can represent a structure of system 100 before one or more turbines 115 are installed in system 100. In addition, support structure 290 can be further configured for supporting one or more turbines 115; alternatively, system 100 can further comprise additional support structures for one or more turbines 115.

It is further noted that FIG. 3 does not depict surface 201, as surface 201 represents an environment upon which system 100 is placed and/or installed. Hence, FIG. 3 can further represent system 100 prior to being installed on surface 201 and prior to one or more turbines 115 being installed. Indeed, system 100 can be modular and shipped to an installation location unassembled, and then assembled on surface 201 at the installation location.

Returning to FIGS. 1 and 2, in general, one or more sidewalls 107 and chimney tower 113 extend from opposite sides of heat absorbing roof 105. Furthermore, sidewalls 107, along with heat absorbing roof 105, as well as surface 201 upon which system 100 is installed, can define interior space 109. For example, in an in-use position, one or more sidewalls 107 can comprises sides of interior space 109, a surface 201 upon which system 100 is installed can comprise a bottom of interior space 109, and heat absorbing roof 105 can comprise a top of interior space 109.

Further, while only one sidewall 107 is depicted, as transpired solar air heating collector device 101 is generally circular, transpired solar air heating collector device 101 can be of any shape which defines interior space 109, and hence any number of sidewalls that correspond to a number of edges of transpired solar air heating collector device 101 are within the scope of present implementations. For example, in some implementations, transpired solar air heating collector device 101 can be octagonal, in which case transpired solar air heating collector device 101 comprises eight sidewalls.

Plurality of air inlet openings 111, draw in exaggeration in FIG. 2, are generally distributed across heat absorbing roof 105, and can have a total open area that about matches, or is larger than, a total cross-section of air volume exiting chimney tower 113 when heated air in interior space 109 flows from interior space 109 through chimney tower 113. For example, a total open area of plurality of air inlet openings 111 can have a total open area that is larger than a cross-section area of chimney tower 113 (e.g. a transverse cross-section). However, in general, plurality of air inlet openings 111 can comprise one or more of perforations, micro-perforations, dimples, slits, holes, and the like in one or more perforated heat absorbing panels 103 and/or gaps between one or more perforated heat absorbing panels 103. Furthermore, plurality of air inlet openings 111 are generally distributed across heat absorbing roof 105 can be evenly and/or unevenly distributed, though are generally spread out over as much of heat absorbing roof 105 as possible. In particular implementations, each plurality of air inlet openings 111 comprise a perforation that can be equivalent 1 to 2 mm in diameter. However, smaller and more numerous perforations are within the scope of present implementations; indeed, smaller and more numerous openings can be better at capturing a heat boundary layer at heat absorbing roof 105.

Heat absorbing roof 105 can further be sloped with respect to one or more sidewalls 107 and chimney tower 113 so that one or more of moisture that collects on heat absorbing roof 105 (e.g. rain, dew and the like), will flow towards sidewalls 107 and to facilitate air flow within interior space 109. For example between one or more sidewalls 107, and chimney tower 113, heat absorbing roof 105 can have a slope in range of about 0° to about 10° with a top of sidewalls 107 being lower than a base of chimney tower 113 when system 100 is in a use position. In other words, a height of heat absorbing roof 105 can increase from circumferential edges of heat absorbing roof 105 to chimney tower 113. The slope can also increase in size closer to chimney tower 113.

Chimney tower 113 generally comprises a chimney, a hollow tower, and the like extending from transpired solar air heating collector device 101 in a direction about opposite one or more sidewalls 107. Chimney tower 113 is connected to interior space 109 so that heated air in interior space 109 can flow through and/or up chimney tower 113. In other words, in an in-use position, chimney tower 113 extends upwards and air flows from interior space 109 upwards through chimney tower, and out an opening at a top of chimney tower 113. In some of these implementations, interior space 109 and chimney tower 113 can define an integrated space such that the interior of chimney tower 113 and interior space 109 are integrated together.

One or more turbines 115 are generally located on a path of airflow from interior space 109 through chimney tower 113. One or more turbines 115 can hence be located in one or more of interior space 109, in chimney tower 113, at a base of chimney tower 113 and the like. In particular non-limiting implementations, as depicted, one or more turbines 115 comprise an arrangement of turbines that surround a base of chimney tower 113 (e.g. where chimney tower 113 meets interior space 109); a portion of turbines 115 can be located in interior space 109, while another portion of turbines 115 can be located in chimney tower 113 and/or at a base of chimney tower 113.

Furthermore, each of one or more turbines 115 is generally configured to generate electricity as heated air passes by and/or through each of one or more turbines, for example by turning, with each of the one or more turbines 115 generating electricity. Each of the one or more turbines 115 is hence connectable to one or more of an electricity storage device and a power grid so that electricity generated thereby can be collected and/or stored and/or provided to devices that can utilize the generated electricity. In general, each of one or more turbines 115 can comprise a power conversion unit, power generation device, one or more blades, a generator and the like, and/or any other components that can generate electricity by interacting with moving air.

While transpired solar air heating collector device 101 is generally depicted as circular, any shape is within the scope of present implementations. Furthermore, while chimney tower 113 is depicted as extending from about a centre of transpired solar air heating collector device 101, chimney tower 113 can be located at any position within transpired solar air heating collector device 101 where heated air can flow from interior space 109 through chimney tower 113. In addition, while surface 201 upon which system 100 is installed is depicted as flat and/or even and/or unsloped, system 100 can be adapted for installation on uneven surfaces and/or sloped surfaces including hillsides for example, by adapting dimensions and/or shapes of one or more sidewalls 107 and/or by adapting a support structure of system 100.

Furthermore, an area of transpired solar air heating collector device 101 is generally large compared to a diameter of chimney tower 113. For example, a diameter of chimney tower 113 can range from one or two meters to two hundred meters or more (with chimney towers on the wider end of this range being on the order of a kilometer high), and corresponding areas of transpired solar air heating collector device 101 can range from tens of square meters to thousands of square meters, and even tens and hundreds of thousands of square meters to many square kilometers, depending on an amount of energy to be generated. However, an area of transpired solar air heating collector device 101 can be about one half to about two-thirds smaller than the area of a corresponding greenhouse-type solar collector.

Figure 4:
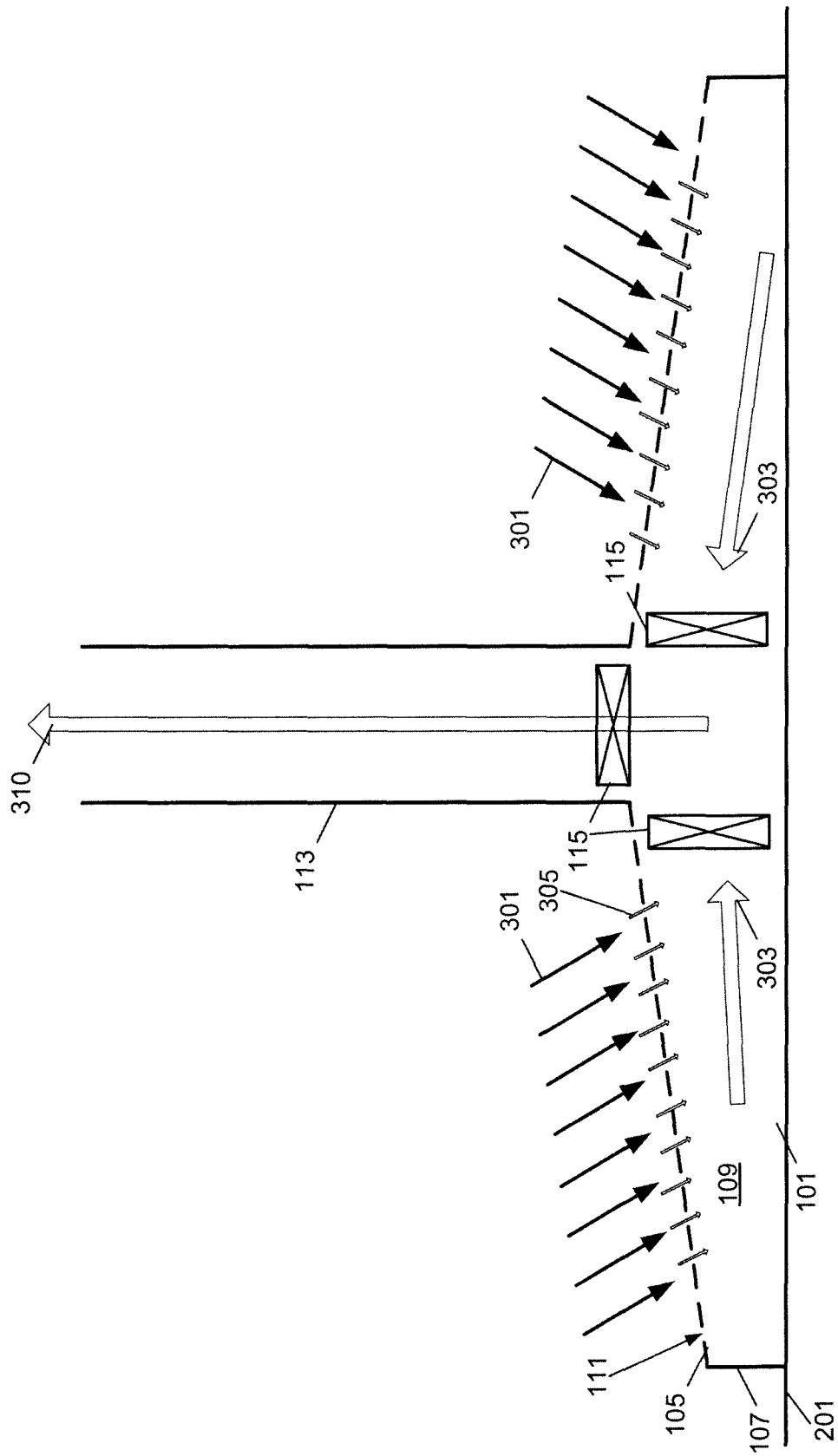
FIG. 4 depicts the system of FIG. 1 in operation, according to non-limiting implementations.

Attention is next directed to FIG. 4, which is substantially similar to FIG. 2, with like elements having like numbers, and which shows system 100 in operation in an in-use position on surface 201, with an exterior side of heat absorbing roof 105 generally facing the sky, and chimney tower 113 generally extending upwards to sky. While one or more or more perforated heat absorbing panels 103 are not indicated in FIG. 3, they can nonetheless be present; however heat absorbing roof 105 can be formed from other combinations of heat absorbing devices that include plurality of air inlet openings 111.

In any event, in FIG. 4, solar radiation 301 irradiates heat absorbing roof 105, which in turn heats air 303 both in interior space 109 and ambient air 305 adjacent on an outward facing side heat absorbing roof 105, which can also be referred to as a heat boundary layer. As transpired solar air heating collector device 101 is configured to absorb solar radiation 301 and heat air 303 one or more of within the interior space 109 and adjacent to heat absorbing roof 105 (i.e. the heat boundary layer), once air 303 heats up and creates a pressure differential between interior space 109 and ambient air external to transpired solar air heating collector device 101, a chimney effect occurs and the heated air flow in a path of least resistance up chimney tower 113. In other words, transpired solar air heating collector device 101 is configured to form an air updraft 310 through chimney tower 113 created by the heated air within interior space 109, which in turn turns turbines 115, generating electricity. Hence, system 100 can be referred to as a transpired solar collector updraft chimney tower. Furthermore, air 305 adjacent heat absorbing roof 105, including the heat boundary layer, is drawn in through plurality of air inlet openings 111, heated and/or further heated either when in contact with an external side of heat absorbing roof 105 and/or within interior space 109, and flows through turbines 115 and chimney tower 113 in updraft 310. Air 305 is represented as small arrows in FIG. 4, with only one small arrow being labelled as air 305 for clarity.

In other words, in some implementations, FIG. 4 depicts a method for generating electricity comprising: creating an air pressure difference between interior space 109 of transpired solar air heating collector device 101 and chimney tower 113 connected thereto, transpired solar air heating collector device 101 comprising: heat absorbing roof 105; interior space 109 adjacent heat absorbing roof 105; and, plurality of air inlet openings 111 distributed over heat absorbing roof 105 and configured to allow ambient air to flow from outside heat absorbing roof 105 into interior space 109, the air pressure difference created when sun radiation 301 illuminates heat absorbing roof 105; and, generating electricity using one or more turbines 115 positioned on a path of airflow from interior space 109 through chimney tower 113.

Furthermore, FIG. 4 clearly depicts one or more turbines 115 being located on a path of airflow from interior space 109 through chimney tower 113.

In general, the use of heat absorbing roof 105, with plurality of air inlet openings 111 therein, in place of greenhouse-type heating of a surface can lead to increases in heating efficiencies over greenhouse-type solar chimney collectors, which in turn leads to smaller areas for heat absorbing roof 105 as compared to area of greenhouse-type surfaces when generating similar amounts of electricity.

Persons skilled in the art will appreciate that there are yet more alternative implementations and modifications possible. For example, while one or more sidewalls 107 are depicted has having no air openings, in other implementations, one or more sidewalls 107 can be adapted to assist with air flow into interior space 109, and hence one or more sidewalls 107 can comprise one or more openings (not depicted) configured to assist with ambient airflow into interior space 109, for example in implementations where a total open area of plurality of air inlet openings 111 is less than a total cross-section of air volume exiting the chimney tower. Such additional openings in one or more sidewalls 107 can hence be used to provide additional airflow not available from plurality of air inlet openings 111.

In yet further implementations, one or more sidewalls 107 can also comprise one or more air inlet openings, and indeed, in some of these implementations, one or more sidewalls 107 can be similar to heat absorbing roof 105. Furthermore, in other implementations, sidewalls 107 can be omitted, with heat absorbing roof 105 extending at an angle from chimney tower 113, with circumferential edges of heat absorbing roof 105 being configured to reside on surface 201, interior space 109 being defined by sloped heat absorbing roof 105 and surface 201.

In yet further implementations, transpired solar air heating collector device 101 can be adapted to partially include one or more glazed panels which can be one or more of perforated and non-perforated. For example, attention is next directed to FIG. 5, which depicts a perspective view of a system 100a that is substantially similar to system 100, with like elements having like numbers, however an "a" appended thereto. Hence, system 100a comprises a transpired solar air heating collector device 101a, similar to transpired solar air heating collector device 101, sidewalls 107a, and a chimney tower 113a, with one or more turbines (not depicted) inside system 100a. Furthermore, system 100a is depicted as sitting and/or resting and/or as installed on a surface 201a.

Figure 5:
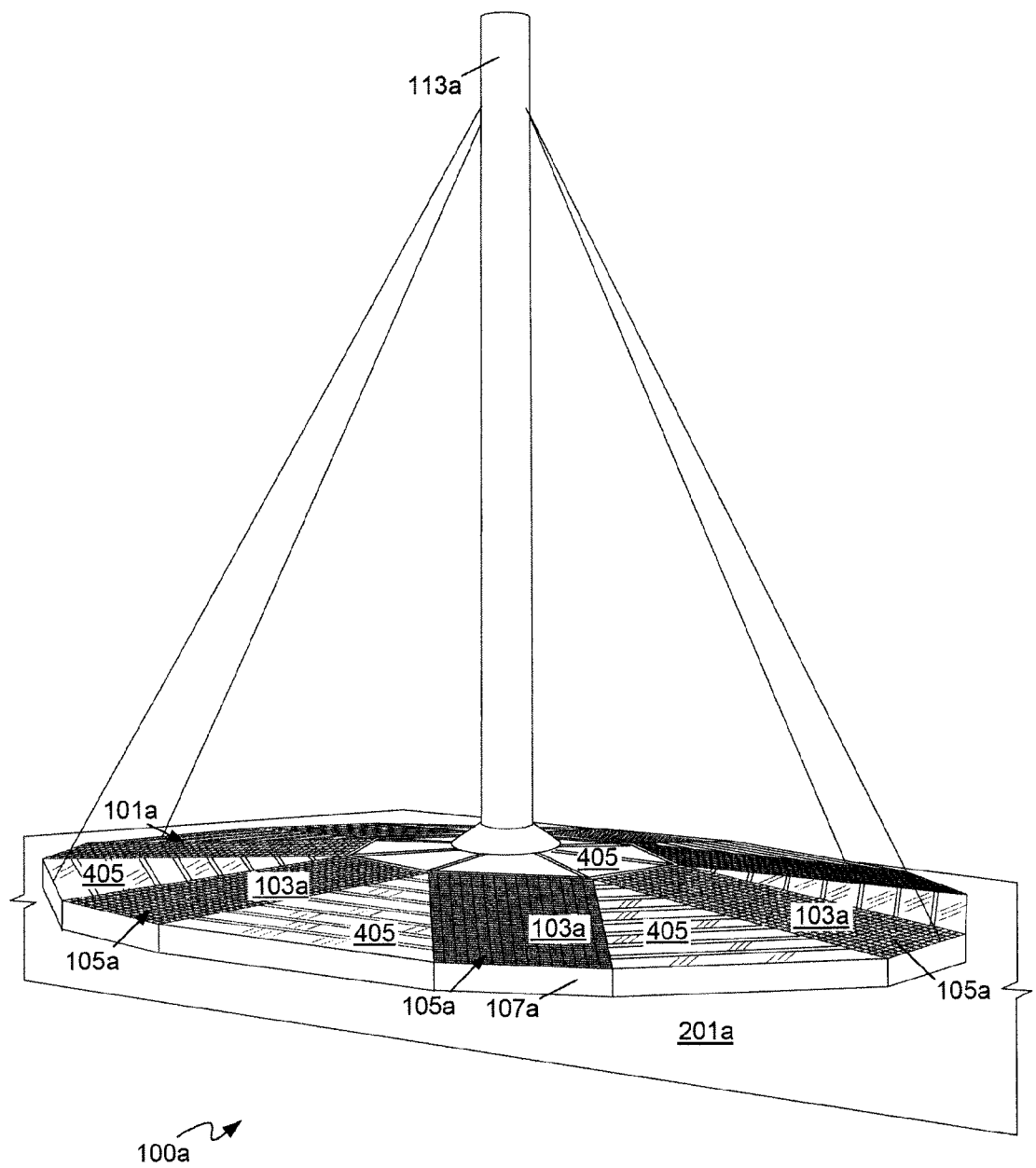
FIG. 5 depicts a perspective view of an alternative system that includes a transpired solar collector chimney tower, according to non-limiting implementations.

However, in these implementations, transpired solar air heating collector device 101a comprises one or more glazed panels 405 adjacent one or more perforated heat absorbing panels 103a of heat absorbing roof 105a, only a portion of each being numbered in FIG. 5 for clarity, the one or more glazed panels 405 and the one or more perforated heat absorbing panels 103a forming a roof of transpired solar air heating collector device 101a, with an interior space, similar to interior space 109, adjacent thereto. For example, as depicted, one or more glazed panels 405 alternate with one or more perforated heat absorbing panels 103a in a radial pattern. Furthermore, as depicted, one or more glazed panels 405 are also located at a base of chimney tower 113a. However, other configurations of glazed panels 405 are within the scope of present implementations; the depicted implementation can be used, for example, when using perforated heat absorbing panels 103a that are generally rectangular, without having to cut and/or otherwise shape perforated heat absorbing panels 103a.

In any event, in the depicted implementations system 100a functions in a manner similar to system 100, but further includes glazed panels 405, which comprise transparent material including, but not limited to, glass, plastic, polymer and the like, which enable solar heating of a surface 201a under system 100a so that surface 201a can continue to heat the interior space inside system 100a at night as surface 201a generally heats up when irradiated by solar radiation that passes through glazed panels 405.

Figure 6:
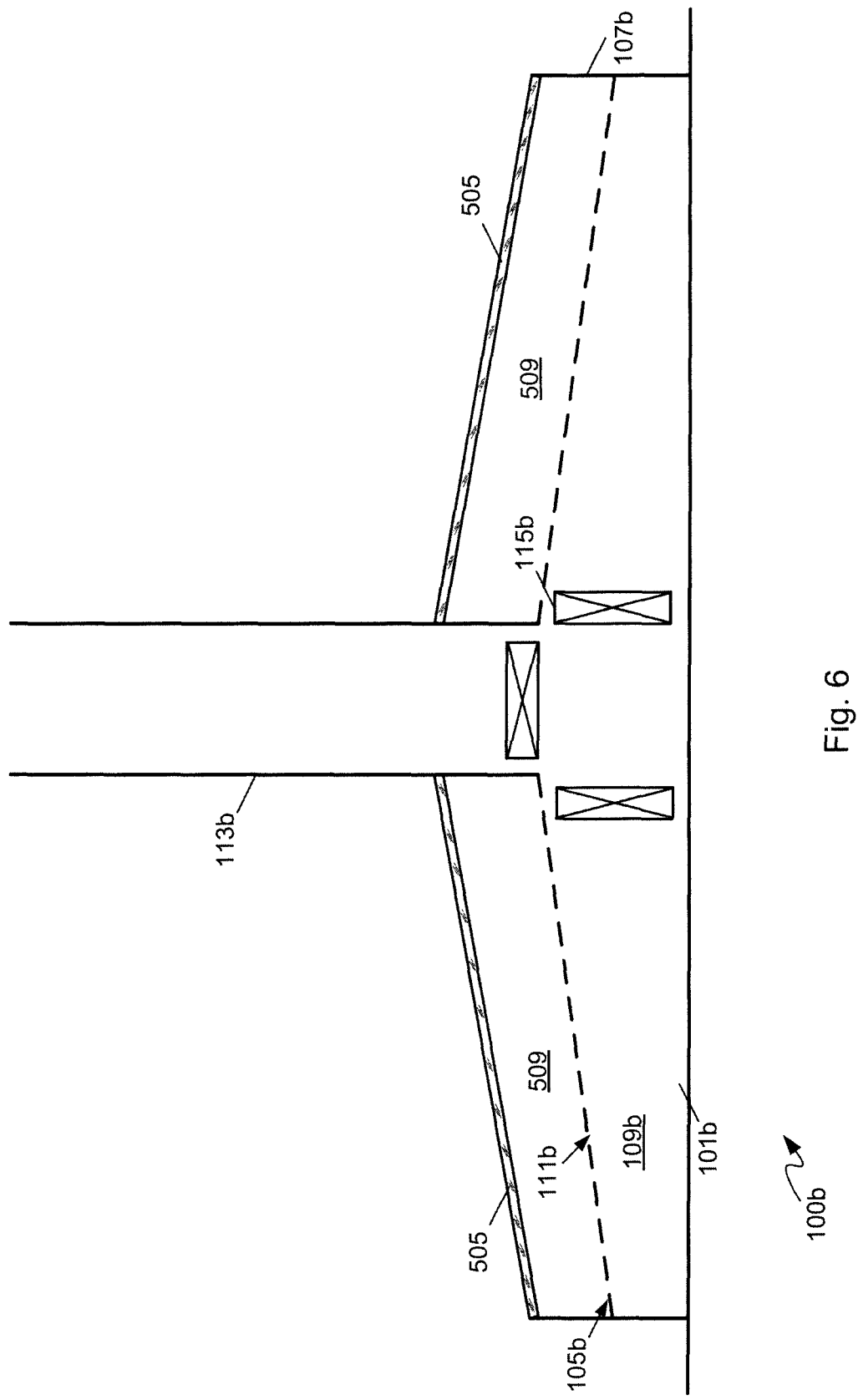
FIG. 6 depicts a schematic cross-sectional view of yet another alternative system that includes a transpired solar collector chimney tower with two-stage heating, according to non-limiting implementations.

In yet further implementations, glazed panels can be used to further increase efficiency of system 100. For example, attention is next directed to FIG. 6, which depicts a system 100$b$ that is substantially similar to FIG. 2, with like elements having like numbers, however with a "b" appended thereto, and with FIG. 6 depicting a cross-section of system 100$b$. Hence, system 100$b$ comprises a transpired solar air heating collector device 101$b$ comprising a heat absorbing roof 105$b$, an interior space 109$b$, and a plurality of air inlet openings 111$b$ distributed over heat absorbing roof 105, as well as a chimney tower 113$b$ and one or more turbines 115$b$. However, in these implementations, system 100$b$ further comprises one or more glazed panels 505 over heat absorbing roof 105$b$, the one or more glazed panels 505 and heat absorbing roof 105$b$ defining a second space 509, the heat absorbing roof 105$b$ separating interior space 109$b$ and second space 509. In these implementations, sidewalls 107$b$ can extend along both interior space 109$b$ and space 509. Furthermore air can flow into space 509 either via one or more apertures in sidewalls 107$b$, adjacent space 509, and/or glazed panels 505 can be perforated (i.e. glazed panels 505 can include, but is not limited to, a polymer, plastic and the like that is both perforated and at least partially transparent to solar radiation). Alternatively, when system 100$b$ includes apertures in sidewalls 107$b$, glazed panels 505 can be non-perforated. Either way, glazed panels 505 are at least partially transparent to solar radiation.

In some implementations, one or more glazed panels 505 can cover only a portion of heat absorbing roof 105$b$, with further sidewalls extending there from, to create a plurality of spaces 509 over heat absorbing roof 105$b$, so that exposed portions of heat absorbing roof 105$b$ alternate with covered portions of heat absorbing roof 105$b$. In systems such as system 100$a$, where glazed panels 405 alternate with perforated heat absorbing panels 103$a$, one or more glazed panels 103$a$ can be covered by further glazed panels as in system 100$b$ to define a further space over each portion of heat absorbing roof 105$a$.

In any event, glazed panels 505 create a greenhouse effect within space 509 which provides preheating of air within space 509, which is further heated by heat absorbing roof 105$b$ absorbing heat from solar radiation, as depicted in FIG. 4. In other words, two-stage heating of air occurs in system 100$b$.

Figure 7:
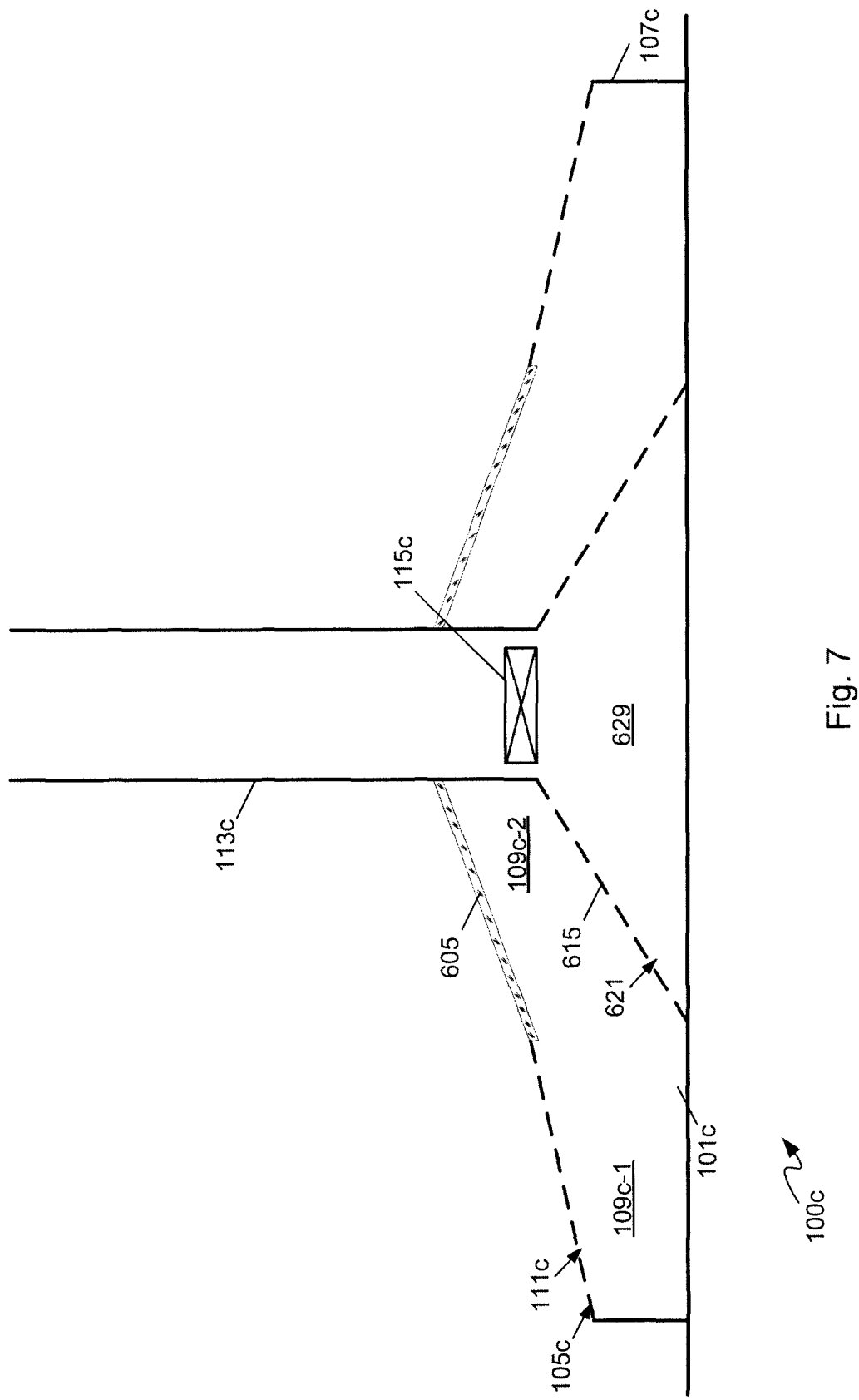
FIG. 7 depicts a schematic cross-sectional view of yet another alternative system that includes a transpired solar collector chimney tower with two-stage heating, according to non-limiting implementations.

However, other geometries for such two-stage heating are within the scope of present implementations. For example, attention is next directed to FIG. 7, which depicts a system 100$c$ that is substantially similar to FIG. 2, with like elements having like numbers, however with a "c" appended thereto, and with FIG. 7 depicting a cross-section of system 100$c$. Hence, system 100$c$ comprises a transpired solar air heating collector device 101$c$ comprising a heat absorbing roof 105$c$, an interior space with two portions: interior spaces 109$c$-1, 109$c$-2 and a plurality of air inlet openings 111$c$ distributed over heat absorbing roof 105, as well as a chimney tower 113$c$ and one or more turbines 115$c$ (though only one turbine 115$c$ is depicted for clarity). However, in these implementations, system 100$c$ further comprises one or more glazed panels 605 adjacent heat absorbing roof 105$c$, with one or more glazed panels 605 arranged radially adjacent chimney tower 113$c$, and heat absorbing roof 105$c$ arranged radially adjacent sidewalls 107$c$; hence, heat absorbing roof 105$c$ has a larger average diameter than glazed panels 605. A join between glazed panels 605 and heat absorbing roof 105$c$ can be sealed and/or not sealed and/or attached and/or removabley attached, and further glazed panels 605 and heat absorbing roof 105$c$ can be supported by a support structure (not depicted). Glazed panels 605 can be one or more of perforated and non-perforated, and are otherwise similar to glazed panels 505. From FIG. 7, it is apparent that each of glazed panels 605 and heat absorbing roof 105$c$ are at different angles, with an angle of glazed panels 605 being greater than an angle of heat absorbing roof 105$c$, each of the angles defined with respect to sidewalls 107$c$ and/or a surface upon which system 100$c$ is installed. However, in other implementations, glazed panels 605 and heat absorbing roof 105$c$ can be at a similar angle.

Furthermore, interior space 109$c$-1 and interior space 109$c$-2 are generally connected, however interior space 109$c$-1 is adjacent heat absorbing roof 105$c$ while interior space 109$c$-2 is adjacent glazed panels 605. There is generally no barrier there between, nor is there any boundary there between, other than features of any support structure, and interior spaces 109$c$-1, 109$c$-2 generally form one interior space.

System 100$c$ further comprises a second heat absorbing surface 615, that is similar to heat absorbing roof 105$c$, located under glazed panels 605, heat absorbing surface 615 comprising a plurality of air inlet openings 621 similar to air inlet openings 111$c$. Furthermore, heat absorbing surface 615 defines a second interior space 629, with heat absorbing surface 615 separating interior space 109$c$-2 from second interior space 629. Second interior space 629 is adjacent chimney tower 113$c$, and is connected thereto.

In any event, heat absorbing roof 105$c$ functions similar to heat absorbing roof 105, as described above, and the combination of glazed panels 605 with heat absorbing surface 615 creates a greenhouse effect within space 109$c$-2 which provides preheating of air within space 109$c$-2, which is further heated by heat absorbing surface 615, such that two-stage heating occurs, similar to the effect described above with respect to FIG. 6. Heated air in interior spaces 109$c$-1, 109$c$-2 (whether heated by heat absorbing roof 105$c$ and/or by the combination of glazed panels 605 and heat absorbing surface 615) then flows from interior space 109$c$-2 through plurality of air openings 621 into interior space 629 and up chimney tower 113$c$, interacting with one or more turbines 115$c$ to generate electricity. Hence, in system 100$c$, two-stage heating occurs. Furthermore, as interior space 109$c$-1 is adjacent to heat absorbing roof 105$c$ and interior space 109$c$-2 is adjacent glazed panels 605, heating of air in interior spaces 109$c$-1, 109$c$-2 occurs both using the method described with respect to FIG. 4, and the greenhouse effect described with respect to FIG. 6. In particular, however, air flows from interior space 109$c$-1, where it is heated by heat absorbing roof 105$c$, to interior space 109$c$-2, where it is further heated by the greenhouse effect, through air inlet openings 621 to interior space 629, and up chimney tower 113$c$. Hence two stage heating can also occur by heating using heat absorbing roof 105$c$ and further heating using the greenhouse effect. In some of these implementations, each of heat absorbing roof 105$c$ and glazed panels 605 can have an area of tens of square kilometers; hence portions of interior space 109$c$-1 can be widely separated from portions of interior space 109$c$-2, and both pre-heating, and volume of air flow can be considerable.

Described herein are a system and/or an apparatus configured to solar heat large volumes of air to higher temperatures more efficiently than with greenhouse-type collectors, move the air without the need for a fan using a chimney effect, and utilize the moving air to drive a turbine and/or generator to produce electricity.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system that uses solar radiation for generating electricity comprising:
   a transpired solar air heating collector device comprising:
      a heat absorbing roof;
      an interior space adjacent the heat absorbing roof; and, a plurality of air inlet openings distributed over the heat absorbing roof and configured to allow ambient air to flow from outside the heat absorbing roof into the interior space;
   a chimney tower extending from the transpired solar air heating collector device and connected to the interior space such that heated air in the interior space flows from the interior space through the chimney tower;
   one or more turbines positioned within one or more of the interior space and the chimney tower and on a path of airflow from the interior space through the chimney tower;
   a second heat absorbing surface comprising a second plurality of air inlet openings the second heat absorbing surface separating the interior space from a second interior space adjacent the chimney tower, and
   one or more glazed panels adjacent to the heat absorbing roof, the one or more glazed panels located over the second heat absorbing surface.

2. The system of claim 1, wherein the transpired solar air heating collector device further comprises sidewalls extending from the heat absorbing roof, the sidewalls and the heat absorbing roof at least partially defining the interior space.

3. The system of claim 1, wherein a total open area of the plurality of air inlet openings is greater than a total cross-section of air volume exiting the chimney tower when the heated air in the interior space flows from the interior space through the chimney tower.

4. The system of claim 1, wherein the transpired solar air heating collector device is configured to one or more of:
   absorb the solar irradiation and heat air within the interior space; and,
   absorb the solar radiation and heat the air adjacent to the heat absorbing roof.

5. The system of claim 1, wherein the transpired solar air heating collector device is configured to form an air updraft through the chimney tower created by the heated air within the interior space.

6. The system of claim 1, wherein a colour of an outward side of the heat absorbing roof is one or more of:
   a solar irradiation absorbing colour; and,
   black.

7. The system of claim 1, wherein the heat absorbing roof is formed from one or more of: a metal material, perforated heat absorbing panels, flat perforated heat absorbing panels, and corrugated perforated heat absorbing panels.

8. The system of claim 1, wherein the one or more turbines comprise an arrangement of turbines that surround a base of the chimney tower.

9. The system of claim 1, wherein each of the one or more turbines is connectable to one or more of:
   an electricity storage device; and,
   a power grid.

10. The system of claim 1, further comprising a support structure located within the interior space, the support structure configured to support one or more of:
    the transpired solar air heating collector device; and,
    the chimney tower.

11. The system of claim 1, wherein the transpired solar air heating collector device is configured for installation on a surface.

12. The system of claim 1, wherein the heat absorbing roof further comprises one or more further glazed panels adjacent one or more perforated heat absorbing panels, the one or more further glazed panels being either perforated or non-perforated.

* * * * *